Figure 1:
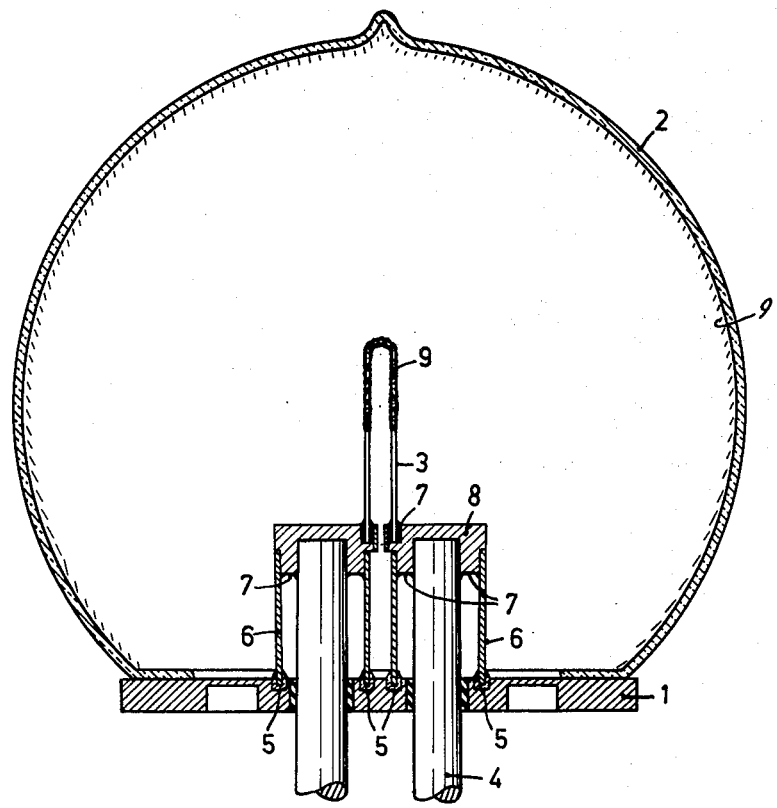

April 19, 1966  G. WOLLANK ETAL  3,247,417
ELECTRIC INCANDESCENT LAMP
Filed Sept. 25, 1962  2 Sheets-Sheet 1

INVENTORS
G. WOLLANK
P. ECKERLIN
J. STUTE

United States Patent Office 3,247,417
Patented Apr. 19, 1966

3,247,417
ELECTRIC INCANDESCENT LAMP
Gerhard Wollank, Gottingen, and Peter Eckerlin and Josef Stute, Aachen, Germany, assignors to North American Philips Company, Inc., New York, N.Y., a corporation of Delaware
Filed Sept. 25, 1962, Ser. No. 226,061
5 Claims. (Cl. 313—222)

The invention relates to gas-filled, electric incandescent lamps, the incandescent body of which is made from a high-melting-point metal carbide, for example TaC, HfC, ZrC or NbC or mixed crystals thereof.

Electric incandescent lamps having a carbide incandescent body are known per se. In the operation of such lamps the carbide emits carbon by evaporation. Attempts have been made to avoid the decomposition of the incandescent body by the use of an atmosphere containing apart from an inert gas (neon, argon, krypton, xenon or nitrogen) hydrocarbon or hydrogen or both. In the proximity of the hot incandescent body the hydrocarbon dissociates and gives off the carbon to the incandescent body. Thus the incandescent body can be regenerated up to the complete consumption of the hydrocarbon. Hydrocarbons can be partly regained in the gas space of the lamp from the evaporated carbon and the hydrogen, forming part of the gas filling or produced by the decomposition of hydrocarbon. However, the volume of this reaction is highly restricted, since with temperatures of more than 900° C. the partial pressure of equilibrium of the hydrocarbon lies far below 1% of the partial pressure of the hydrogen, even under the thermodynamically most favourable conditions in the formation of methane on solid carbon. In this respect it should be considered that it is not efficient to choose the partial pressure of the hydrogen in excess of 5% of the total pressure; a higher content involves a higher thermal conductivity of the gas and hence important losses of energy of the incandescent body. Moreover, this involves a restriction of the lifetime of the lamp. Apparently, the states of equilibrium in the formation of hydrocarbon in the gas space are not at all attained, so that the concentration of hydrocarbons in the proximity of the incandescent body is not sufficient for absorbing carbon; an excess quantity of hydrogen is provided, so that carbon is withdrawn from the incandescent body and even more rapidly according as the partial pressure of hydrogen is higher. Moreover, with higher hydrogen percentages in the closed system of the lamp the thermo-diffusion becomes manifest, since the lighter hydrogen prevails preferably in the proximity of the hot incandescent body and the heavier hydrocarbon prevails farther away near the colder parts of the lamp, so that the withdrawal of carbon is further accelerated.

Below 900° C. the reaction velocity is so small that no appreciable formation of hydrocarbon in the gas space or on separated carbon can take place.

Therefore, it will be obvious that lamps having carbide incandescent bodies exhibit soon a carbon deposit on the inner side in the described atmospheres with temperatures above 3600° K. and that the lifetime will be restricted to not more than 5 to 25 hours.

With incandescent lamps having an incandescent body of a high-melting-point carbide or mixed carbide and a gas filling consisting wholly or partly of hydrogen or a hydrocarbon or both, with or without an inert gas, the lifetime is, however, considerably longer, if in accordance with the invention the lamp contains a catalyst for the reaction between carbon and hydrogen for the formation of hydrocarbon.

This catalyst has to permit the formation of hydrocarbon from carbon and hydrogen at temperatures, with which hydrocarbons, particularly methane are present in fairly large quantities in a state of equilibrium at the side of hydrogen, while the reaction velocity is so high that the whole quantity of carbon evaporated from the incandescent body is converted.

It is efficacious to construct the electric incandescent lamp so that the total inner surface of the lamp is coated with a layer of the catalyst. It is necessary in this case to heat these parts to a temperature with which the catalyst can become operative. It is thus avoided that on the inner side of the lamp places are found where the carbon can be deposited, which would thus be withdrawn from the cycle. It is sufficient for the catalyst to be applied in such a thin layer to the glass bulb that this layer does not involve any appreciable light absorption (<3%).

The catalyst may consist of one of the metals of the transitional sequence of the periodic system or alloys thereof, preferably nickel, cobalt or iron. With the last-mentioned metals the desired reaction is performed with adequate velocity above a temperature of 250° C. For technical reasons temperatures of more than 600° C. are avoided; moreover, with these high temperatures the catalyst would be readily deactivated, while the pressure of equilibrium of the hydrocarbons, particularly of methane becomes too low for the desired cycle.

The layer of the catalyst may be applied by vaporization of the catalyst or a compound thereof to the internal parts of the lamp. If a compound is chosen it must be converted into the catalyst proper by a suitable chemical process. The application by vaporization may be carried out previous to the assembly of the lamp parts; it is efficient, however, to perform this operation subsequently. To this end the catalyst may be applied to the incandescent body or to an additional heating wire for example by electro-plating or by impregnation in the melt, which wire may be made of tungsten, tantalum or a different suitable substance, after which evaporation takes place in vacuo.

The invention will now be described more fully with reference to FIGS. 1 and 2.

Figure 2:
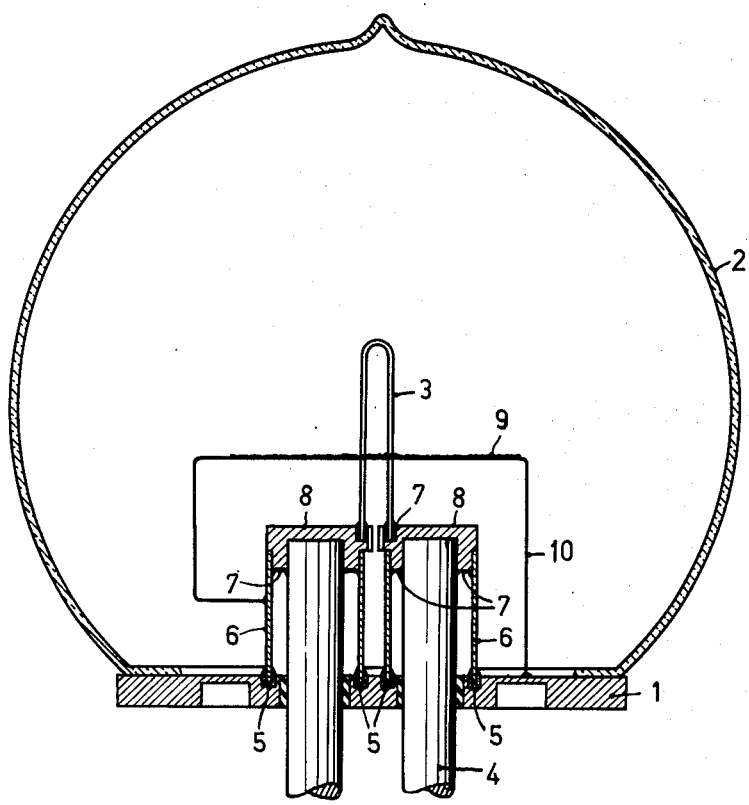

FIGS. 1 and 2 are cross sectional views of lamps according to the invention.

Herein the following reference numerals designate:
1 a metal disc for supporting the lamp,
2 a glass bulb secured to A by the known glass-metal sealing technique,
3 an incandescent body of TaC,
4 current supply wires,
5 an insulating glass seal,
6 stem tubes for the incandescent body 3 and the current supply wires 4,
7 soldering places,
8 a connecting piece between 3, 4 and 6.

As is shown in FIG. 1 the catalyst 9 is applied to the incandescent body as well as the inner surface of the lamp and as shown in FIG. 2 it is applied to the filament wire 10, which can be heated via the metal disc 1 and one of the stem tubes 6 and which is arranged so that, when the catalyst evaporates, all places of the lamp are attained by the catalyst with certainty.

After the assembly of the lamp shown in FIG. 1 or 2, the lamp is annealed in a conventional manner. After cooling the incandescent body 3 (FIG. 1) or the heating wire 2 (FIG. 2) is heated at the temperature required for the evaporation of the catalyst or the compound thereof under constant exhaustion. Subsequent to an after-treatment, if necessary, of the applied layer or subsequent to a renewed annealing process the bulb can be filled with the gas mixture. This mixture may contain, apart from the inert gas 1% by volume of hydrogen and 3% by lume of methane or 2% of hydrogen and 2% of ethane or ethylene. The ratio between H₂ and CH₄ ust be chosen so that with the chosen temperature of the rface of the lamp an excess quantity of hydrogen with spect to the hydrocarbon of at least 2:1, as compared ith the content in the thermodynamic state of equilibrum, is available, since a large portion of the gas has a mperature with which the substantially total quantity f hydrocarbon dissociates and the liberated carbon, gether with the carbon of the incandescent body in the as are collected near the wall and converted into hydroarbon. The maximum limit of the hydrogen has to be % by volume for the aforesaid reasons.

The lifetime of such lamps amounts from 30 to 90 ours with a burning temperature of more than 3600° K.; s compared with lamps without a catalyst the lifetime is t least doubled. A further advantage is obtained in the ourse of blackening; with lamps without a catalyst blackning starts shortly after the lamp is taken in use, wherers the lamp with the catalyst remains clear until the nd of its lifetime. When, owing to the deactivation of the atalyst, the carbon deposition starts, the incandescent ody burns through shortly afterwards.

We claim:

1. An incandescent lamp comprising an evacuable light-transmissible envelope having therein a filament of a metal carbide having a melting point exceeding that of tungsten and a gaseous filling consisting essentially of an inert gas and less than 5% by volume of a gas selected from the group consisting of hydrogen and a hydrocarbon, and a solid metal catalyst disposed within the envelope for promoting a reaction between carbon and hydrogen for the formation of the hydrocarbon.

2. An incandescent lamp comprising an evacuable light-transmissible envelope having therein a filament of a metal carbide having a melting point exceeding that of tungsten and a gaseous filling consisting essentially of an inert gas and less than 5% by volume of a gas selected from the group consisting of hydrogen and a hydrocarbon, and a layer of a solid metal catalyst disposed on the inner surface of the envelope for promoting a reaction between carbon and hydrogen for the formation of the hydrocarbon.

3. An incandescent lamp comprising an evacuable light-transmissible envelope having therein a filament of a metal carbide having a melting point exceeding that of tungsten and a gaseous filling consisting essentially of an inert gas and less than 5% by volume of a gas selected from the group consisting of hydrogen and a hydrocarbon, and a solid metal catalyst selected from the group consisting of nickel, cobalt and iron disposed within the envelope for promoting a reaction between carbon and hydrogen for the formation of the hydrocarbon.

4. An incandescent lamp comprising an evacuable light-transmissible envelope having therein a filament of a metal carbide having a melting point exceeding that of tungsten and a gaseous filling consisting essentially of an inert gas and not more than 5% by volume of hydrogen and a hydrocarbon, and a layer absorbing less than 3% of the light output of the lamp of a solid metal catalyst selected from the group consisting of nickel, cobalt and iron disposed on the inner wall of the envelope for promoting a reaction between carbon and hydrogen for the formation of the hydrocarbon.

5. An incandescent lamp comprising an evacuable light-transmissible envelope having therein a filament of a carbide of a metal selected from the group consisting of tantalum, hafnium, zirconium and niobium and a gaseous filling consisting essentially of an inert gas and not more than 5% by volume of hydrogen and methane, and a layer absorbing less than 3% of the light output of the lamp of a solid metal catalyst selected from the group consisting of nickel, cobalt and iron on the inner wall of the envelope for promoting a reaction between carbon and hydrogen for the formation of the hydrocarbon.

References Cited by the Examiner

UNITED STATES PATENTS

| 674,754 | 5/1901 | Blau | 316—2 |
| 1,812,527 | 6/1931 | Grass et al. | |
| 1,960,972 | 5/1934 | Grimm et al. | 208—8 |
| 2,025,565 | 12/1935 | Blau | 313—179 X |
| 2,072,788 | 3/1937 | Andrews | 313—179 |
| 2,097,679 | 11/1937 | Swanson | 313—222 X |
| 2,191,156 | 2/1940 | Pier et al. | 208—10 |
| 2,913,388 | 11/1959 | Howell et al. | 208—10 X |
| 2,928,977 | 3/1960 | Roth et al. | 313—222 |
| 3,022,438 | 2/1963 | Cooper | 313—222 |

HERMAN KARL SAALBACH, *Primary Examiner.*

GEORGE N. WESTBY, *Examiner.*